United States Patent
Middleman et al.

[11] 3,922,220
[45] Nov. 25, 1975

[54] PERMEABLE MEMBRANE SEPARATION DEVICE AND METHOD

[75] Inventors: Stanley Middleman, Amherst; Richard D. Devellian, Rockport, both of Mass.

[73] Assignee: Kenics Corporation, North Andover, Mass.

[22] Filed: Nov. 2, 1973

[21] Appl. No.: 412,316

[52] U.S. Cl. ............... 210/23; 23/258.5; 210/321
[51] Int. Cl.² .................. B01D 31/00; B01D 13/00
[58] Field of Search ....... 210/321, 22, 23, 493, 456; 55/158; 23/258.5

[56] References Cited
UNITED STATES PATENTS

| | | | |
|---|---|---|---|
| 3,256,678 | 6/1966 | Bertin et al. | 55/158 |
| 3,585,131 | 6/1971 | Esmond | 210/493 X |
| 3,648,754 | 3/1972 | Sephton | 210/321 X |
| 3,672,509 | 6/1972 | Buchmann et al. | 210/321 |
| 3,695,448 | 10/1972 | Johansson | 210/403 X |

OTHER PUBLICATIONS
Rosenblatt, Def. Pub. T912,007,912.

*Primary Examiner*—Frank A. Spear, Jr.

[57] ABSTRACT

A system and method for enhancing the selective transport of fluid particles through a semipermeable membrane. The system consists of a conduit, comprising a semipermeable membrane, containing within it a plurality of sheet-like elements extending longitudinally within said conduit. Means are provided for flowing a first fluid through said conduit. Means are also provided, either for receiving the permeate passing through said semipermeable membrane or for submerging said semipermeable membrane in a second fluid. Each sheet-like element in the conduit is curved to turn the direction of fluid flow by being arranged in alternating right- and left-handed curvature groups (a group consisting of one or more elements). As a result, each particle of the fluid flowing through said conduit is moved in a programmed manner toward and away from the wall of the conduit. The semipermeable membrane selectively passes certain particles of at least one of the fluids. In one type of application, such passage tends to create a condition, commonly called "polarization," in the fluid layer adjacent the inner wall of the conduit which decreases the rate at which the selected fluid particles pass through the semipermeable membrane. The action of the curved elements removes such layer from the inner wall, thus overcoming the inhibiting effect of such layer on the transport of the selected fluid particles through the membrane. In another type of application, in which a polarization layer is not formed, but in which it is desirable to distribute the fluid material adjacent such inner wall under non-turbulent conditions, the curved elements effectively produce the desired results without resorting to turbulent flow.

9 Claims, 2 Drawing Figures

PERMEABLE MEMBRANE SEPARATION DEVICE AND METHOD

BACKGROUND OF THE INVENTION

1. Field of the Invention

Device and method for the selective transport of fluid particles through a semipermeable membrane using the phenomenon of reverse osmosis or ultrafiltration.

2. Prior Art Problems

The applicability of the phenomena of the selective transport of fluid particles through a semipermeable membrane to such processes as the separation of components of a plural component fluid, such as a solution, is of a relatively recent development, being limited generally to the last four decades. These phenomena fall generally into two classes known as reverse osmosis and ultrafiltration. Ultrafiltration operates at lower pressures such as 10 to 100 psi, whereas reverse osmosis operates at pressures up to about 2000 psi. This difference may be explained in terms of the components which are retained by the membrane in each system. Reverse osmosis retains microsolutes such as sodium chloride with osmotic pressures of the order of 1000 psi and rejections by the membrane of around 90% or better. As is well known reverse osmosis does not occur until the mechanical pressure of the fluid exceeds the osmotic pressure. Ultrafiltration systems, however, retain suspended particles or macrosolutes with molecular weights greater than about 500 to 1000 depending on the membrane and solute structures. Such materials exert negligible osmotic pressures and are subjected to virtually 100% rejection by the membrane. Thus for ultrafiltration systems, where the osmotic pressure is essentially zero, the mechanical pressure of the fluid need not be high to effect flow of the solvent or suspension fluid through the membrane.

For the purposes of the present invention the generic term semipermeable membrane separation will be used to indicate both reverse osmosis and ultrafiltration. Likewise, the term solute will be used to indicate both micromolecular materials dissolved in a fluid and macromolecular materials dissolved or suspended in a fluid, the fluid in each case being termed a solvent.

Both reverse osmosis systems and ultrafiltration systems suffer from an adverse phenomenon known as polarization. This is the result of an accumulation of the solute at the membrane surface. Therefore the concentration of these materials tends to increase at such surface. In the case of reverse osmosis, the higher concentration creates a higher osmotic pressure thus requiring higher mechanical pressure to cause the solvent to pass through the membrane. In the case of ultrafiltration the increase in concentration causes a viscous or gel layer to form and restrict the product flow drastically. If the concentration becomes high enough, in the case of reverse osmosis, the solute may crystallize or precipitate and completely plug the surface of the membrane. Also the higher pressure required to produce product flow in reverse osmosis will force increasing amounts of the solute through the membrane thus further decreasing the effectiveness of the system.

Attempts at reducing polarization have consisted largely in trying to produce sufficient agitation turbulence in the flow pattern to dislodge the polarization layer. Such attempts have been of limited effectiveness due to various reasons most of which were heretofore unrecognized. In most cases the turbulating obstruction occupied such a large fraction of the flow volume that the volumetric flow rate was greatly reduced. Other obstruction flow inserts created stagnation pockets where impurities could collect and eventually foul the system.

Basically, however, these proposed solutions failed to recognize that, as the surface of the membrane is approached, the polarization layer tends to become more and more concentrated so that something more than moderate amounts of turbulation were needed to dislodge the most deleterious part of the polarization layer. Moreover, the production of very high turbulence is expensive and interferes in many other ways with the effective operation of the system. Likewise, in instances where at least one of the fluids adjacent the semipermeable membrane is adversely affected by turbulence, such other proposals would be impractical.

SUMMARY OF THE INVENTION

The present invention substantially eliminates the limitations and defects described above by interposing, within a tubular semipermeable membrane, a structure consisting of a plurality of curved sheet-like elements extending longitudinally of said tubular member and having a curvature to turn the direction of the material flowing through the tubular member. The elements are arranged in alternating right and left-handed curvature groups (a group consisting of one or more elements) with the leading and trailing edges of adjacent elements in adjacent groups being disposed at a substantial angle to each other.

It is believed that the unexpected degree of improvement produced by the present structure is due to the fact that, in such a structure, each elemental portion of the flowing fluid moves in a highly ordered programmed manner from the wall of the tubular membrane to the center of the stream and back again to the tubular wall. The result is that, even at low and moderate Reynolds numbers, the polarization layer on the inner surface of the tubular wall is constantly being removed from the membrane surface and other portions of the fluid are constantly being brought to such surface. Therefore, the concentration polarization is substantially reduced resulting in improved effectiveness of the system. When the transport phenomenon produces an increased concentration of particles near such inner surface, rather than a polarization layer, the present structure operates in a similar fashion to uniformly distribute such a particles throughout the fluid under non-turbulent flow conditions.

DETAILED DESCRIPTION OF THE INVENTION

Figure 1:
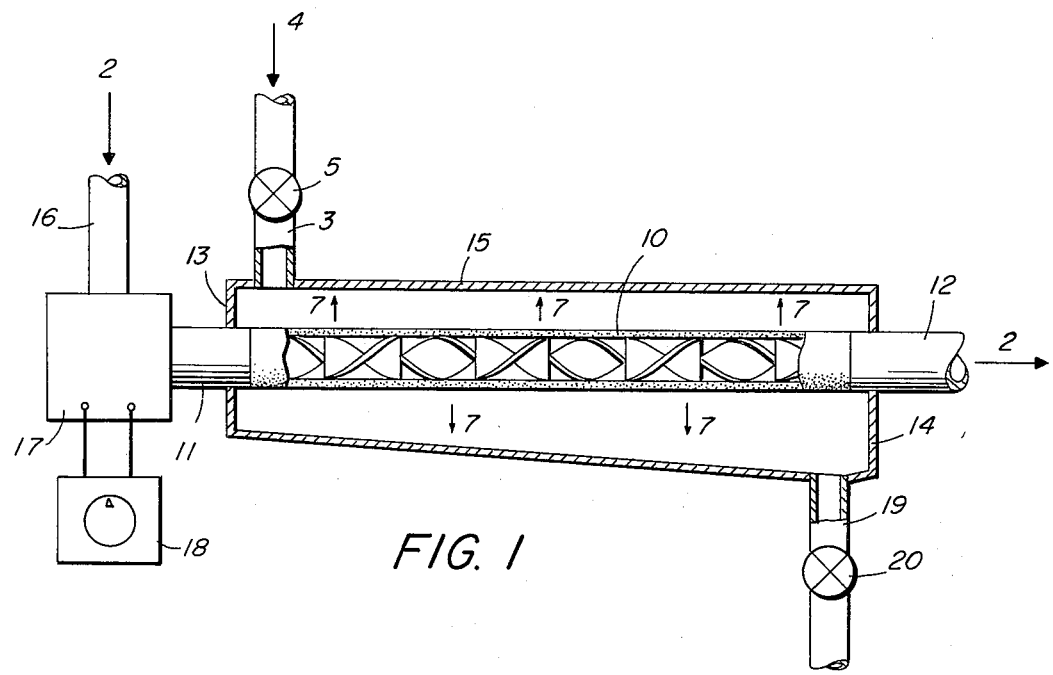
FIG. 1 is a diagrammatic representation of a system incorporating the present invention and with a portion of the semipermeable membrane conduit broken away.

In FIG. 1, 10 is a hollow tube, preferably cylindrical in cross-section, comprised of a semipermeable membrane material. Such materials are well known, among the most common being cellulose acetate membranes classified by American Standard numbers. However, any other type of membrane having a predetermined permeability suitable for the particular use to which it is to be put may be used.

Tube 10 is mounted at its ends on tubular support members 11 and 12. Support 11 constitutes an entry port and support 12 constitutes an outlet port for one of the fluids involved. Supports 11 and 12 are mounted in end walls 13 and 14 of a fluid receiving housing 15 which completely encloses the tube 10 so that such tube may be completely immersed in the other fluid, which may be a permeate passing through the semipermeable membrane 10, or another fluid introduced into housing 15. A first fluid 2 is supplied through an inlet pipe 16 to a pump 17 whose speed may be controlled in any desired manner by a suitable control device 18. In this manner fluid 2 is supplied through inlet port 11 to the interior of tube 10. Where the fluid 2 comprises a solvent containing a solute, a portion of the solvent will pass through the semipermeable membrane 10 as a permeate which passes into the housing 15. In order to adapt the system to applications in which a second fluid is introduced around the tube 10, the housing 15 may be provided with an inlet pipe 3 through which a second fluid 4 may be introduced. Such introduction may be suitably controlled by a control valve 5: In this way fluid 4 may be introduced to submerge the semipermeable membrane of tube 10.

Where the fluid 2 comprises a solvent containing a solute, the osmotic effect of the material of tube 10 operates to separate the larger molecular weight solute components from the lower molecular weight solvent which is exuded as a permeate through the walls of the tube 10 as indicated by the arrows 7 adjacent the tube 10 in FIG. 1. Such permeate is thus received into the housing 15 and is discharged from such housing through a discharge conduit 19. Conduit 19 is preferably provided with a flow control valve 20 so that the flow of the permeate may be regulated in such a manner as to keep the tube 10 bathed in such permeate.

Figure 2:
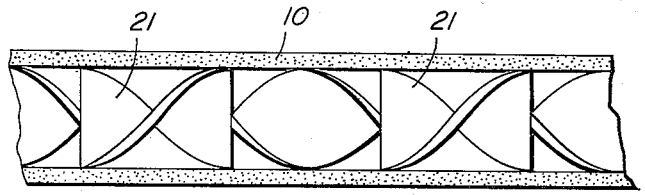
FIG. 2 is an elonged cross-section of a portion of the semipermeable membrane conduit showing the flow modifying elements in elevation within said conduit.

As shown more clearly in FIG. 2, within tube 10 is disposed a plurality of serially arranged curved sheet-like elements 21. Each of these elements is constructed of a flat sheet whose width preferably is equal to the inner diameter of tube 10 and whose length is preferably up to several times its width. Each element is so twisted that its upstream and downstream edges are at a substantial angle to each other. This angle may vary between about 60° and 210°. Also each successive element is twisted in the opposite direction with respect to its preceding element and the adjacent edges of successive elements are disposed at a substantial angle, preferably about 90°, with respect to each other. Instead of reversing the twist of each successive element, a plurality of elements twisted in one sense may be followed by a plurality of elements twisted in the opposite sense. Therefore, the elements may be considered broadly as being arranged in alternating right- and left-handed curvature groups, it being understood that a group may consist of one or more elements.

When the input fluid 2 is caused to flow through the above structure, tests have shown that several different components of motion are imparted to the fluid. The most significant of these, for the purposes of the present invention, is that each particle of the fluid is forced to migrate repetitively, in a programmed manner, from the wall of the permeable membrane to the center of the stream and back again to the wall. The action is induced by a transverse displacement of the fluid due to the reversal of the direction of rotation of the stream as it passes from an element twisted in one sense to an element twisted in the opposite sense. Therefore, the accumulation of greater concentrations of the suspended or dissolved material at the wall, which has inhibited effective solvent permeation through the osmotic action in other devices of this kind, is eliminated. A highly uniform concentration is maintained throughout the transverse bulk of the fluid as it flows from one end of the tube 10 to the other. The operation of the above structure is not dependent upon turbulence. Tests have demonstrated that it operates to reduce the polarization layer in the Reynolds number range from 10–1500.

Various modifications may be made in the structure illustrated. For example, while the elements 21 are shown in end to end contact with each other, they may be spaced a short distance from each other, or they may overlap each other to some degree. Similarly, instead of being in contact with the inner walls of tube 10, a small space may be left between them. The significant aspect of the invention which each such variation retains is the reversal of flow induced by the reversely twisted elements which produces the programmed motion of each particle of the fluid as described above to avoid the concentration of solute at the surface of the semipermeable membrane tube 10.

The structure of this invention is also applicable to processes in which a polarization layer is not formed but in which there is a tendency for the transport of fluid particles through the semipermeable membrane to produce a difference between the fluid at one wall of the semipermeable membrane and the fluid located away from such wall. For example, the fluid 2 may be of a kind, such as blood, which can be oxydized and the fluid 3 may be oxygen. Particles of oxygen will be transported through the semipermeable membrane 10, thus tending to create a higher concentration of oxydized fluid adjacent the inner wall of semipermeable membrane 10. Blood is very fragile and can easily be damaged by turbulent flow. However, the nature of the present structure is such that a very effective and thorough dispersion of the oxydized blood layer is produced throughout the entire body of blood without any deleterious turbulence.

Other utilizations of this invention as described above will suggest themselves to those skilled in the art.

What is claimed is:

1. A semipermeable membrane separation system comprising:
    a. a conduit having a wall comprising a semipermeable membrane;
    b. means for passing a first fluid through said conduit;
    c. means for containing a second fluid outside of said conduit;
    d. said conduit containing a plurality of curved sheet-like elements extending longitudinally within said conduit, each of said elements having a width substantially equal to the inner diameter of said conduit, dividing said conduit into two separated flow paths, and having a curvature to impart a transverse rotational component of flow to said first fluid, said elements being arranged in alternating right- and left-handed curvature groups wherein said transverse rotational component is alternately reversed, the leading and trailing edges of adjacent elements of succesive groups being disposed at a substantial angle with respect to each other.

2. A system as in claim 1 in which said first fluid fills said conduit and said second fluid submerges said semipermeable membrane.

3. A system as in claim 2 in which said first fluid comprises a solvent containing a solute and said second fluid comprises said solvent.

4. A system as in claim 2 in which said first fluid comprises an oxydizable material and said second fluid comprises oxygen.

5. A system as in claim 3 in which said solute comprises a microlecular solute dissolved in said solvent.

6. A system as in claim 3 in which said solute comprises a macromolecular substance dispersed or dissolved in said solvent.

7. A system as in claim 3 in which said membrane comprises a sheet of cellulose acetate.

8. The method of separating a solvent from a solute comprising:
   a. flowing a fluid consisting of said solute disposed in said solvent through a conduit having a semipermeable membrane wall, said membrane being permeable to said solvent and substantially impermeable to said solute;
   b. moving each elemental particle of said fluid in a programmed manner toward and away from said wall by imparting to said fluid flow successively right- and left-handed rotational components of flow by means of a series of curved sheet-like elements extending longitudinally within said conduit, each of said elements having a curvature to impart a transverse rotational component of flow to said fluid, said elements being arranged in alternating right- and left-handed curvature groups whereby said transverse rotational component is alternately reversed; and
   c. collecting the solvent after it has passed through said membrane.

9. The method as in claim 8 in which said fluid is caused to flow through said conduit at a Reynolds number in the region of about 10 to 1500.

* * * * *